United States Patent
Wang et al.

(10) Patent No.: US 10,379,276 B2
(45) Date of Patent: Aug. 13, 2019

(54) DISPLAY DEVICE AND METHOD FOR FORMING THE SAME

(71) Applicants: BOE Technology Group Co., Ltd., Beijing (CN); Hefei BOE Optoelectronics Technology Co., Ltd., Anhui (CN)

(72) Inventors: Rui Wang, Beijing (CN); Lei Jiang, Beijing (CN); Biao Yang, Beijing (CN); Jing Tian, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 0 days.

(21) Appl. No.: 16/122,022

(22) Filed: Sep. 5, 2018

(65) Prior Publication Data

US 2019/0079233 A1    Mar. 14, 2019

(30) Foreign Application Priority Data

Sep. 8, 2017    (CN) .......................... 2017 1 0805533

(51) Int. Cl.
*G02B 5/30*    (2006.01)
*G09G 3/22*    (2006.01)

(52) U.S. Cl.
CPC ............. *G02B 5/3025* (2013.01); *G09G 3/22* (2013.01)

(58) Field of Classification Search
CPC ............................... G02B 5/3025; G09G 3/22
See application file for complete search history.

(56) References Cited

U.S. PATENT DOCUMENTS

| | | | |
|---|---|---|---|
| 2010/0207964 A1* | 8/2010 | Kimmel | G02B 6/0036 345/690 |
| 2011/0141393 A1* | 6/2011 | Han | G02F 1/011 349/62 |
| 2016/0147006 A1* | 5/2016 | Large | G02B 6/0036 349/62 |

* cited by examiner

*Primary Examiner* — Joseph L Williams
(74) *Attorney, Agent, or Firm* — Westman, Champlin & Koehler, P.A.

(57) ABSTRACT

A display device and a method for forming the same are provided. The display device includes a backlight module, a display panel, an optical film, and a cladding layer arranged in a stack-up manner. The cladding layer is configured to fix the backlight module and the display panel. The cladding layer includes a first portion and a second portion. The first portion is at a light-emitting side of the display panel, at least a part of the first portion is located between the display panel and the optical film, and the second portion is a lateral surface of the backlight module.

20 Claims, 2 Drawing Sheets

DISPLAY DEVICE AND METHOD FOR FORMING THE SAME

CROSS-REFERENCE TO RELATED APPLICATION

The present application claims a priority of the Chinese patent application No. 201710805533.0 filed on Sep. 8, 2017, which is incorporated herein by reference in its entirety.

TECHNICAL FIELD

The present disclosure relates to the field of display product manufacturing technology, and in particular, to a display device and a method for forming the same.

BACKGROUND

A display device in the related art includes a display panel, a polarizer and a tape for fixing the display panel and the display device together. The tape is attached along the edges of the polarizer, so the tape may warp. As a result, the adhesion of the polarizer may be poor, and the product yield may be adversely affected, which is not conducive to production line operations and control.

SUMMARY

A display device is provided in the present disclosure, including a backlight module, a display panel, an optical film and a cladding layer arranged in a stack-up manner, where the cladding layer is configured to fix the backlight module and the display panel and includes a first portion and a second portion, where the first portion is at a light-emitting side of the display panel, at least a part of the first portion is between the display panel and the optical film, and the second portion is on a lateral surface of the backlight module.

Optionally, a region of the first portion of the cladding layer corresponding to the optical film is nonopaque.

Optionally, the cladding layer further includes a third portion on a lower surface of the backlight module, where the third portion is connected to the second portion, and the lower surface of the backlight module is a surface of the backlight module away from the display panel.

Optionally, the optical film is on an upper surface of the cladding layer, where the upper surface of the cladding layer is a surface of the cladding layer away from the display panel.

Optionally, the optical film includes a polarizer.

Optionally, the first portion of the cladding layer includes a first region corresponding to the polarizer and a second region at a periphery of the first region, and a light blocking layer is at a side of the second region of the first portion away from the display panel.

Optionally, the light blocking layer includes a black ink layer.

Optionally, an adhesive layer is between the cladding layer and the display panel, and between the cladding layer and the backlight module.

Optionally, a material of the cladding layer includes a PET material.

Optionally, the light blocking layer is further on a lateral surface of the second portion of the cladding layer away from the display panel and a lower surface of the third portion of the cladding layer away from the display panel.

A method for forming a display device is further provided in the present disclosure, where the display device includes a backlight module, a display panel, an optical film and a cladding layer arranged in a stack-up manner, where the cladding layer is configured to fix the backlight module and the display panel and includes a first portion and a second portion, where the first portion is at a light-emitting side of the display panel, at least a part of the first portion is between the display panel and the optical film, and the second portion is on a lateral surface of the backlight module, where the manufacturing method includes: assembling the display panel and the backlight module; and attaching the first portion of the cladding layer onto the display panel, and attaching the second portion of the cladding layer onto the lateral surface of the backlight module, and assembling the cladding layer to the display panel and backlight module.

Optionally, the cladding layer further includes a third portion attached to a lower surface of the backlight module, where the assembling the cladding layer to the display panel and backlight module further includes: attaching the third portion onto the lower surface of the backlight module away from the display panel.

Optionally, prior to the attaching the first portion of the cladding layer onto the display panel and attaching the second portion of the cladding layer onto the lateral surface of the backlight module, the method further includes: forming an adhesive layer on the cladding layer.

Optionally, subsequent to the attaching the first portion of the cladding layer onto the display panel and attaching the second portion of the cladding layer onto the lateral surface of the backlight module, the method further includes: arranging the optical film at a side of the first portion of the cladding layer away from the display panel.

Optionally, prior to the attaching the first portion of the cladding layer onto the display panel and attaching the second portion of the cladding layer onto the lateral surface of the backlight module, the method further includes: assembling the cladding layer and the optical film.

Optionally, the assembling the cladding layer and the optical film further includes: forming a release layer at a side of the adhesive layer away from the cladding layer; where prior to the attaching the first portion of the cladding layer onto the display panel and attaching the second portion of the cladding layer onto the lateral surface of the backlight module, the method further includes: removing the release layer.

Optionally, the cladding layer is a transparent based material, and the method further includes: forming a light blocking layer at a region of the cladding layer without the optical film.

Optionally, the first portion of the cladding layer includes a first region corresponding to the optical film and a second region at a periphery of the first region, the release layer includes a first sub-release layer corresponding to the first region of the first portion of the cladding layer and a second sub-release layer corresponding to the second region of the first portion of the cladding layer, where the first sub-release layer and the second sub-release layer are separated from each other; the method further includes: peeling off the first sub-release layer, and attaching the first region of the first portion of the cladding layer onto a region of the display panel corresponding to the optical film; peeling off the second sub-release layer, and attaching the second region of the first portion of the cladding layer and the second portion of the cladding layer.

Optionally, the second sub-release layer includes: a first sub-portion corresponding to the second region of the first portion of the cladding layer and a second sub-portion corresponding to the second portion of the cladding layer, where the first sub-portion and the second sub-portion of the second sub-release layer are separated from each other; where the peeling off the second sub-release layer and attaching the second region of the first portion of the cladding layer and the second portion of the cladding layer further includes: peeling off the first sub-portion of the second sub-release layer, and attaching the second region of the first portion of the cladding layer; peeling off the second sub-portion of the second sub-release layer, and attaching the second portion of the cladding layer onto the lateral surface of the backlight module.

Optionally, the second sub-release layer further includes a third sub-portion corresponding to the third portion of the cladding layer; where subsequent to the peeling off the first sub-portion of the second sub-release layer and attaching the second region of the first portion of the cladding layer, the method further includes: peeling off the third sub-portion of the second sub-release layer, and attaching the third portion of the cladding layer onto the lower surface of the backlight module away from the display panel.

DETAILED DESCRIPTION OF THE EMBODIMENTS

The features and principles of the present disclosure are described in detail below with reference to the accompanying drawings. The embodiments are for illustrative purposes only and are not intended to limit the scope of the disclosure.

Figure 1:
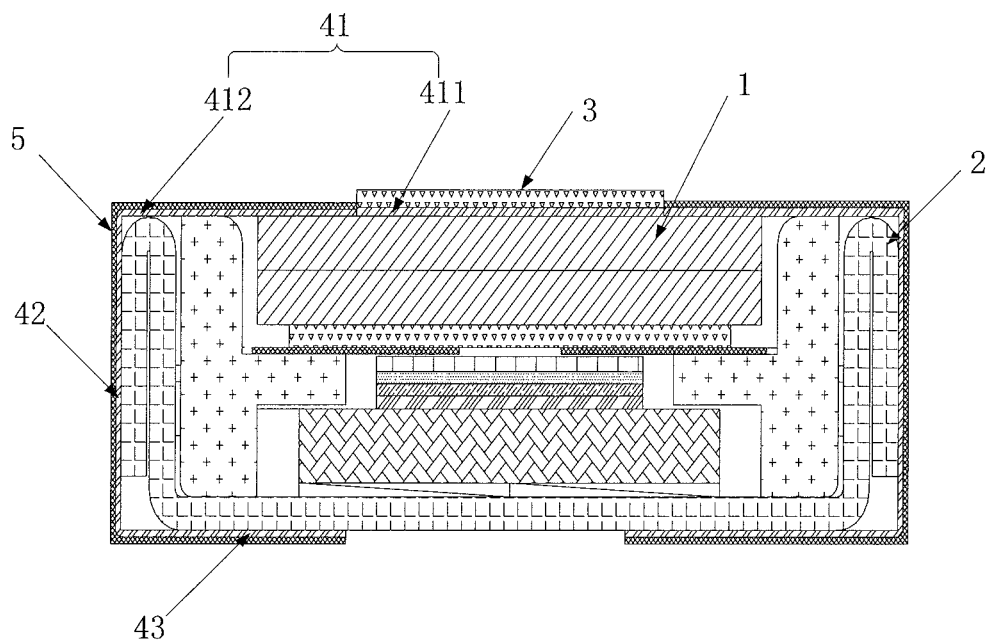
FIG. 1 is a schematic view of a display device in some embodiments of the present disclosure.

As shown in FIG. 1, a display device is provided in some embodiments of the present disclosure, including a backlight module 2, a display panel 1 and a cladding layer 4 arranged in a stack-up manner. The cladding layer is configured to fix the backlight module and the display panel and includes a first portion 41 and a second portion 42. The first portion 41 is at a light-emitting side of the display panel 1. A region of the first portion 41 of the cladding layer 4 corresponding to a display region of the display panel is nonopaque. The second portion 42 is on a lateral surface of the backlight module 2.

Due to the cladding layer 4, it is unnecessary to attach the tape around the polarizer 3 to assemble the display panel 1 and the backlight module 2 after the polarizer 3 is arranged, thereby avoiding the defects caused by the attachment of the tape which may easily warp, meanwhile fixing the display panel 1 and the backlight module 2. In addition, the region of the cladding layer attached to the display region of the display panel 1 is transparent and thus may not adversely affect the display function of the display device, thereby reducing labor costs, simplifying the attachment process, and improving the product yield and the production efficiency.

The cladding layer may be of various structures. In some embodiments of the present disclosure, the cladding layer 4 is made of a transparent base material, but the present disclosure is not limited thereto.

In some embodiments of the present disclosure, the cladding layer 4 further includes a third portion 43 attached to a lower surface of the backlight module 2, the third portion 43 is formed by the edges of the second portion 42 extending outward and bending toward the lower surface of the backlight module 2, the lower surface of the backlight module 2 is the surface of the backlight module 2 away from the display panel 1.

As shown in FIG. 1, the first portion 41 is attached to the light-emitting side surface of the display panel 1, and the region of first portion 41 corresponding to the display region of the display panel 1 is nonopaque. The second portion 42 is attached to a lateral surface of the backlight module 2. The third portion 43 is arranged on the lower surface of the backlight module 2 to ensure the connection stability of the display panel 1 and the backlight module 2.

In some embodiments of the present disclosure, the display device further includes an optical film arranged on an upper surface of the cladding layer 4, and the upper surface of the cladding layer 4 is a surface of the cladding layer 4 away from the display panel 1.

Optionally, the optical film includes a polarizer 3, but the present disclosure is not limited thereto, and the display device in some embodiments of the present disclosure is specifically described below by example of the polarizer 3.

The polarizer 3 is arranged on the cladding layer 4. The first portion 41 of the cladding layer 4 includes a first region 411 and a second region 412 at a periphery of the first region 411. The polarizer 3 is attached onto the first region 411. The display panel 1 and the backlight module 2 are assembled in advance by the cladding layer 4, so there is no need to fix the display panel 1 and the backlight module 2 again by the tape, thereby avoiding the skew of the polarizer 3 caused by attaching the tape, and avoiding defects caused by the curling of the tape.

In some embodiments of the present disclosure, a light blocking layer 5 is arranged at a side of the second region 412 away from the display panel 1, so as to avoid the light leakage.

The specific structure of the light blocking layer 5 may have various forms, as long as light blocking effect can be achieved. For example, in some embodiments of the present disclosure, the light blocking layer 5 may be a light blocking tape, and in some embodiments of the present disclosure, the light blocking layer 5 may be a black ink layer.

In some embodiments of the present disclosure, an adhesive layer 6 is arranged between the cladding layer 4 and the display panel 1 and between the cladding layer 4 and the backlight module 2.

In some embodiments of the present disclosure, an adhesive layer 6 is arranged on a portion where the cladding layer 4 is connected to the display panel 1 and a portion where the cladding layer 4 is connected to the backlight module 2, so as to adhere the cladding layer 4 to the display panel 1 and the backlight module 2. However, the present disclosure is not limited thereto.

The adhesive layer 6 may be formed on the cladding layer 4 through a process such as brushing or spraying an adhesive material or the like. The adhesive layer 6 may also be a double-sided tape or the like.

In some embodiments of the present disclosure, the cladding layer 4 is of an integral structure, and in order to avoid adversely affecting the display of the display device, the region of the cladding layer 4 that is attached to the display region of the display panel 1 needs to have a high transparency.

In some embodiments of the present disclosure, the cladding layer 4 may be made of a PET material (but not limited thereto) having a certain flexibility. When the cladding layer 4 is assembled to the display panel 1 and the backlight module 2, the first portion 41 of the cladding layer 4 is attached to the light-emitting surface of the display panel 1, and the nonopaque region is attached to the display region of the display panel 1, the second portion 42 is bent toward the backlight module 2, then the second portion 42 is attached to the side of the backlight module 2, the third portion 43 is bent toward a side of the backlight module 2 away from the display panel 1, and the third portion 43 is attached to a side of the backlight module 2 further away from the display panel 1.

A method for forming a display device is further provided in some embodiments of the present disclosure, applied to the forming of the above-described display device, including:

assembling the display panel 1 and the backlight module 2;

assembling the cladding layer to the assembled display panel 1 and the backlight module 2, which specifically includes: arranging the first portion 41 of the cladding layer on the display panel 1, and arranging the second portion 42 of the cladding layer on the lateral surface of the backlight module 2.

Due to the cladding layer 4, it is unnecessary to attach the tape around the polarizer 3 to assemble the display panel 1 and the backlight module 2 after the polarizer 3 is arranged, thereby avoiding the defects caused by the attachment of the tape which may easily warp, meanwhile fixing the display panel 1 and the backlight module 2. In addition, the region of the cladding layer attached to the display region of the display panel 1 is transparent and thus may not adversely affect the display function of the display device, thereby reducing labor costs, simplifying the attachment process, and improving the product yield and the production efficiency.

In some embodiments of the present disclosure, the cladding layer 4 further includes a third portion 43 attached to the lower surface of the backlight module 2, and the assembling the cladding layer to the assembled display panel 1 and backlight module 2 specifically includes:

attaching the third portion 43 to a surface of the backlight module 2 away from the display panel 1.

The first portion 41 is attached to the light-emitting side surface of the display panel 1, the second portion 42 is attached to the lateral surface of the backlight module 2, and the third portion 43 is attached to the lower surface of the backlight module 2, which can ensure the connection stability of the display panel 1 and the backlight module 2.

The method in some embodiments of the present disclosure further includes: forming an adhesive layer on the cladding layer prior to the assembling the cladding layer to the assembled display panel and backlight module. The cladding layer 4 is connected to the display panel 1 and the backlight module 2 in an adhesion manner, thereby ensuring the connection stability of the cladding layer 4, the display panel 1, and the backlight module 2.

In some embodiments of the present disclosure, subsequent to the assembling the cladding layer to the assembled display panel 1 and backlight module 2, the method further includes:

arranging a polarizer 3 at a side of the cladding layer 4 away from the display panel 1.

Subsequent to the cladding layer 4 is assembled to the display panel 1 and the backlight module 2, the polarizer 3 is arranged on the cladding layer 4. The first portion 41 of the cladding layer 4 includes a first region 411 and a second region 412 located at a periphery of the first region 411. The polarizer 3 is arranged on the first region 411. The display panel 1 and the backlight module 2 are assembled in advance by the cladding layer 4, so there is no need to fix the display panel 1 and the backlight module 2 again by the tape, thereby avoiding the skew of the polarizer 3 caused by attaching the tape, and avoiding defects caused by the curling of the tape.

Figure 2:
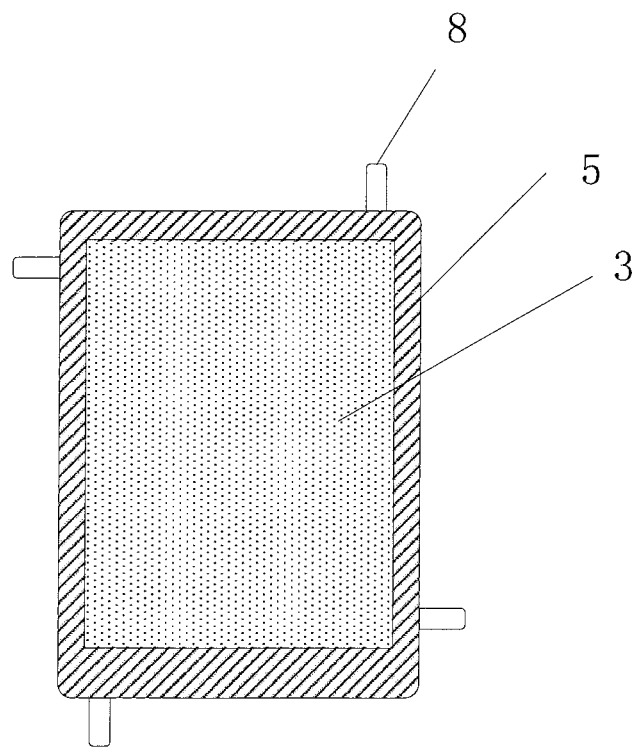
FIG. 2 is a schematic view of a polarizer and a cladding layer which are assembled in some embodiments of the present disclosure.
Figure 3:
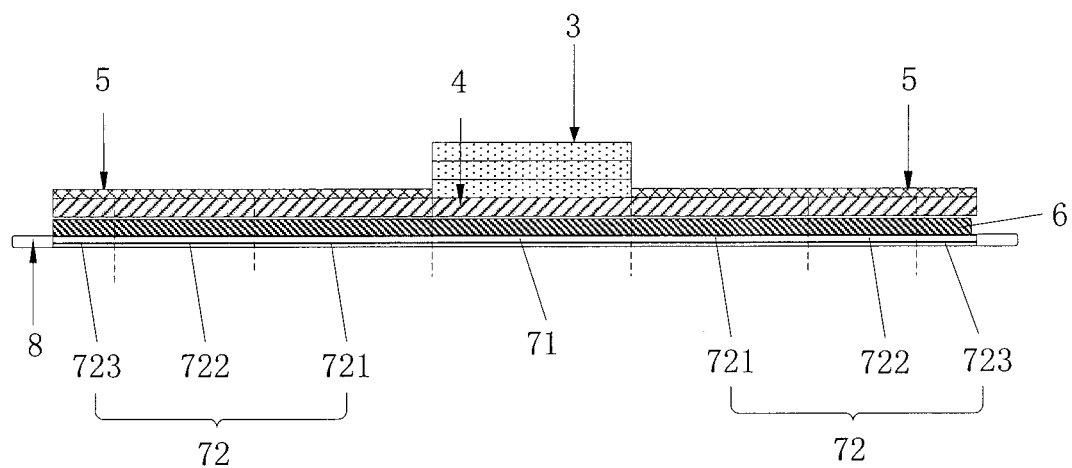
FIG. 3 is a schematic cross-sectional view of a polarizer and a cladding layer which are assembled in some embodiments of the present disclosure.

Optionally, the polarizer 3 may be arranged on the cladding layer 4 after the cladding layer 4 is assembled to the display panel 1 and the backlight module 2; or the cladding layer 4 is assembled to the polarizer 3, and then the assembled cladding layer 4 and polarizer 3 is assembled to the display panel 1 and the backlight module 2. FIG. 2 shows a schematic structural view of the assembled cladding layer 4 and polarizer 3, and FIG. 3 shows a schematic cross-sectional view of the assembled cladding layer 4 and polarizer 3.

In some embodiments of the present disclosure, prior to the assembling the cladding layer to the assembled display panel 1 and the backlight module 2, the method further includes:

assembling the cladding layer 4 and the polarizer 3.

Optionally, the assembling the cladding layer 4 and the polarizer 3 further includes:

forming a release layer 7 at a side of the adhesive layer 6 away from the cladding layer 4.

Prior to the assembling the cladding layer to the assembled display panel 1 and backlight module 2, the method further includes:

removing the release layer 7.

The release layer 7 protects the adhesive layer 6. When the assembly is performed, the release layer 7 is first peeled off, and the polarizer 3 is attached.

In order to facilitate the peeling off of the release layer 7, in some embodiments of the present disclosure, the edge of the release layer 7 is provided with a release tear.

The release ear may be integrally formed with the release layer 7 and formed by a portion of the release layer 7 extending outwardly; the release ear and the release layer 7 may also be separated, and the separate release tear is attached to the edge of the release layer 7.

In some embodiments of the present disclosure, the first portion 41 of the cladding layer 4 includes a second region 412 located at a periphery of the first region 411. In some embodiments of the present disclosure, the release layer 7 includes a first sub-release layer 71 corresponding to the first region 411 and a second sub-release layer 72 corresponding to the second region 412 and the second portion 42, the first sub-release layer 71 and the first sub-release layer 72 are separated from each other. Fixing the display panel 1 and the backlight source together by the cladding layer 4 specifically includes:

removing the first sub-release layer 71;

connecting the first region 411 of the cladding layer 4 to a predetermined region of the display panel 1;

removing the second sub-release layer 72;

connecting the second region 412 of the cladding layer 4 to a peripheral region of the predetermined region of the display panel 1, and connecting the second portion 42 of the cladding layer 4 to the backlight.

After being assembled, the cladding layer 4 and the polarizer 3 are further assembled with the display panel 1 and the backlight module 2. The arrangement of the first portion 41 of the cladding layer 4 increases the area of the polarizer 3. If an entire attachment is performed, poor adhesion is liable to occur, and the arrangement of the second portion 412 on the first portion 41 of the cladding layer 4 corresponding to the periphery of the polarizer 3 increases the difficulty of the adjustment of the attachment position (it is necessary to provide the polarizer 3 corresponding to the preset position of the display panel 1), the first sub-release layer 71 and the second sub-release layer 72 are separately provided. When the assembled cladding layer 4 and polarizer 3 are assembled with the display panel 1 and the backlight module 2, the first sub-release layer 71 may be peeled off first, so that the first region 411 of the first portion 41 of the cladding layer 4 corresponding to the polarizer 3 is firstly attached, that is, the polarizer 3 is provided at a predetermined position, and after the first region 411 is completely attached, the second sub-release layer 72 is peeled off, and the second region 412 and the second portion 42 are attached, preventing the polarizer 3 from being poorly attached, requiring instant position adjustment, also reducing the difficulty of adjustment.

In some embodiments of the present disclosure, the second sub-release layer 72 includes a plurality of separately provided regions corresponding to every edge portions of the polarizer 3, and the edge of each region is provided with the release tear. The removing the second sub-release layer 72 specifically includes:

sequentially removing the plurality of regions of the second sub-release layer 72 by the release ear.

Since the area of the edge region on the display panel 1 corresponding to the periphery of the polarizer 3 is small, the second sub-release layer 72 is of an integral structure, and when peeling off is performed, a breakage may easily occur, and the peeling off cannot be achieved. In some embodiments of the present disclosure, the second sub-release layer 72 includes a plurality of separately provided regions corresponding to every edge portions of the polarizer 3, and the edge of each region is provided with the release tear.

The second sub-release layer 72 has different portions separated from each other, and each portion has an independent release tear. Each portion of the second sub-release layer 72 may be peeled off by means of a corresponding release tear, thereby simplifying the peeling off of the second sub-release layer 72 and improving the product yield.

In some embodiments of the present disclosure, the first portion 41 of the cladding layer 4 includes a first region 411 corresponding to the polarizer and a second region 412 at a periphery of the first region 411. As shown in FIG. 3, the release layer includes a first sub-release layer 71 corresponding to the first region 411 of the first portion 41 of the cladding layer 4 and a second sub-release layer 72 corresponding to the second region 412 of the first portion 41 of the cladding layer 4, and the first sub-release layer 71 and the second sub-release layer 72 are separated from each other.

The method further includes:

peeling off the first sub-release layer 71, and attaching the first region 411 of the first portion 41 of the cladding layer 4 onto a region of the display panel corresponding to the polarizer 3;

peeling off the second sub-release layer 72, and attaching the second region 412 of the first portion 41 of the cladding layer 4 and the second portion 42 of the cladding layer 4.

In some embodiments of the present disclosure, the second sub-release layer 72 includes a first sub-portion 721 corresponding to the second region 412 of the first portion 41 of the cladding layer 4, and a second sub-portion 722 corresponding to the second portion 42 of the cladding layer 4. The first sub-portion 721 and the second sub-portion 722 of the second sub-release layer 72 are separated from each other.

The peeling off the second sub-release layer 72 and attaching the second region 412 of the first portion 41 of the cladding layer 4 and the second portion 42 of the cladding layer 4 further includes:

peeling off the first sub-portion 721 of the second sub-release layer 72, and attaching the second region 412 of the first portion 41 of the cladding layer 4;

peeling off the second sub-portion 722 of the second sub-release layer 72, and attaching the second portion 42 of the cladding layer 4 to the lateral surface of the backlight module 2.

In some embodiments of the present disclosure, the second sub-release layer 72 further includes a third sub-portion 723 corresponding to the third portion 43 of the cladding layer 4.

Subsequent to the peeling off the first sub-portion 721 of the second sub-release layer 72 and attaching the second region 412 of the first portion 41 of the cladding layer 4, the method further includes:

peeling off the third sub-portion 723 of the second sub-release layer 72, and attaching the third portion 43 of the cladding layer 4 to the lower surface of the backlight module away from the display panel 1.

In some embodiments of the present disclosure, the cladding layer 4 is made of a transparent base material, and the method further includes: forming a light blocking layer 5 at a region of the cladding layer 4 without the polarizer. As such, the light blocking may be achieved, and the light leakage may be avoided.

In some embodiments of the present disclosure, the light blocking layer 5 is a light blocking tape, and the light blocking tape is attached to the second region 412. The light blocking layer 5 may be a black ink layer, and the light blocking layer 5 is formed in the second region 412 through a spraying or coating process. It should be understood that, the light blocking layer 5 may further be formed of other materials, as long as the light blocking is achieved, and the specific structure thereof may also have various forms.

The above are merely some embodiments of the present disclosure. A person skilled in the art may make further modifications and improvements without departing from the principle of the present disclosure, and these modifications and improvements shall also fall within the scope of the present disclosure.

What is claimed is:

1. A display device, comprising a backlight module, a display panel, an optical film and a cladding layer arranged in a stack-up manner, wherein the cladding layer is configured to fix the backlight module and the display panel and comprises a first portion and a second portion, wherein the first portion is at a light-emitting side of the display panel, at least a part of the first portion is between the display panel and the optical film, and the second portion is on a lateral surface of the backlight module.

2. The display device according to claim 1, wherein a region of the first portion of the cladding layer corresponding to the optical film is nonopaque.

3. The display device according to claim 2, wherein the cladding layer further comprises a third portion on a lower surface of the backlight module, wherein the third portion is connected to the second portion, and the lower surface of the backlight module is a surface of the backlight module away from the display panel.

4. The display device according to claim 2, wherein the optical film is on an upper surface of the cladding layer, wherein the upper surface of the cladding layer is a surface of the cladding layer away from the display panel.

5. The display device according to claim 4, wherein the optical film comprises a polarizer.

6. The display device according to claim 5, wherein the first portion of the cladding layer comprises a first region corresponding to the polarizer and a second region at a periphery of the first region, and a light blocking layer is at a side of the second region of the first portion away from the display panel.

7. The display device according to claim 6, wherein the light blocking layer comprises a black ink layer.

8. The display device according to claim 1, wherein an adhesive layer is between the cladding layer and the display panel, and between the cladding layer and the backlight module.

9. The display device according to claim 1, wherein a material of the cladding layer comprises a PET material.

10. The display device according to claim 6, wherein the light blocking layer is further on a lateral surface of the second portion of the cladding layer away from the display panel and a lower surface of the third portion of the cladding layer away from the display panel.

11. A method for forming a display device, wherein the display device comprises a backlight module, a display panel, an optical film and a cladding layer arranged in a stack-up manner, wherein the cladding layer is configured to fix the backlight module and the display panel and comprises a first portion and a second portion, wherein the first portion is at a light-emitting side of the display panel, at least a part of the first portion is between the display panel and the optical film, and the second portion is on a lateral surface of the backlight module, wherein the manufacturing method comprises:
assembling the display panel and the backlight module; and
attaching the first portion of the cladding layer onto the display panel, and attaching the second portion of the cladding layer onto the lateral surface of the backlight module, and assembling the cladding layer to the display panel and backlight module.

12. The method according to claim 11, wherein the cladding layer further comprises a third portion attached to a lower surface of the backlight module, wherein the assembling the cladding layer to the display panel and backlight module further comprises:
attaching the third portion onto the lower surface of the backlight module away from the display panel.

13. The method according to claim 12, wherein prior to the attaching the first portion of the cladding layer onto the display panel and attaching the second portion of the cladding layer onto the lateral surface of the backlight module, the method further comprises: forming an adhesive layer on the cladding layer.

14. The method according to claim 13, wherein subsequent to the attaching the first portion of the cladding layer onto the display panel and attaching the second portion of the cladding layer onto the lateral surface of the backlight module, the method further comprises:
arranging the optical film at a side of the first portion of the cladding layer away from the display panel.

15. The method according to claim 13, wherein prior to the attaching the first portion of the cladding layer onto the display panel and attaching the second portion of the cladding layer onto the lateral surface of the backlight module, the method further comprises:
assembling the cladding layer and the optical film.

16. The method according to claim 15, wherein the assembling the cladding layer and the optical film further comprises:
forming a release layer at a side of the adhesive layer away from the cladding layer; wherein
prior to the attaching the first portion of the cladding layer onto the display panel and attaching the second portion of the cladding layer onto the lateral surface of the backlight module, the method further comprises:
removing the release layer.

17. The method according to claim 15, wherein the cladding layer is a transparent based material, and the method further comprises: forming a light blocking layer at a region of the cladding layer without the optical film.

18. The method according to claim 16, wherein the first portion of the cladding layer comprises a first region corresponding to the optical film and a second region at a periphery of the first region, the release layer comprises a first sub-release layer corresponding to the first region of the first portion of the cladding layer and a second sub-release layer corresponding to the second region of the first portion of the cladding layer, wherein the first sub-release layer and the second sub-release layer are separated from each other;
the method further comprises:
peeling off the first sub-release layer, and attaching the first region of the first portion of the cladding layer onto a region of the display panel corresponding to the optical film;
peeling off the second sub-release layer, and attaching the second region of the first portion of the cladding layer and the second portion of the cladding layer.

19. The method according to claim 18, wherein the second sub-release layer comprises: a first sub-portion corresponding to the second region of the first portion of the cladding layer and a second sub-portion corresponding to the second portion of the cladding layer, wherein the first sub-portion and the second sub-portion of the second sub-release layer are separated from each other;
wherein the peeling off the second sub-release layer and attaching the second region of the first portion of the cladding layer and the second portion of the cladding layer further comprises:
peeling off the first sub-portion of the second sub-release layer, and attaching the second region of the first portion of the cladding layer;
peeling off the second sub-portion of the second sub-release layer, and attaching the second portion of the cladding layer onto the lateral surface of the backlight module.

20. The method according to claim 19, wherein the second sub-release layer further comprises a third sub-portion corresponding to the third portion of the cladding layer;
wherein subsequent to the peeling off the first sub-portion of the second sub-release layer and attaching the second region of the first portion of the cladding layer, the method further comprises:
peeling off the third sub-portion of the second sub-release layer, and attaching the third portion of the cladding layer onto the lower surface of the backlight module away from the display panel.

* * * * *